United States Patent
Huang

(10) Patent No.: US 9,728,951 B2
(45) Date of Patent: Aug. 8, 2017

(54) LEAKAGE PROTECTION SOCKET WITH REVERSE CONNECTION PROTECTION

(71) Applicant: Wenzhou Van-Sheen Electric Appliance Co. Ltd., Yueqing, Zhejiang (CN)

(72) Inventor: Huadao Huang, Zhejiang (CN)

(73) Assignee: Wenzhou Van-Sheen Electric Appliance Co., Ltd., Yeuqing (CN)

( * ) Notice: Subject to any disclaimer, the term of this patent is extended or adjusted under 35 U.S.C. 154(b) by 771 days.

(21) Appl. No.: 14/262,850

(22) Filed: Apr. 28, 2014

(65) Prior Publication Data

US 2014/0321006 A1    Oct. 30, 2014

(30) Foreign Application Priority Data

Apr. 28, 2013 (CN) .......................... 2013 1 0157811

(51) Int. Cl.
| | |
|---|---|
| H02H 3/16 | (2006.01) |
| H01R 13/713 | (2006.01) |
| H01R 25/00 | (2006.01) |
| H01H 83/02 | (2006.01) |

(52) U.S. Cl.
CPC ......... H02H 3/162 (2013.01); H01R 13/7135 (2013.01); H01R 25/006 (2013.01); H01H 83/02 (2013.01)

(58) Field of Classification Search
CPC .. H02H 3/162; H01R 13/7135; H01R 25/006; H01H 83/02
See application file for complete search history.

(56) References Cited

U.S. PATENT DOCUMENTS

| | | | | |
|---|---|---|---|---|
| 2,854,544 A * | 9/1958 | Shovic | ................. | H01H 50/648 218/117 |
| 4,518,945 A * | 5/1985 | Doyle | .................. | H01H 51/088 340/12.39 |
| 4,568,997 A * | 2/1986 | Bienwald | ............... | H01H 73/44 335/18 |
| 4,831,496 A * | 5/1989 | Brant | ..................... | H01H 83/04 361/730 |
| 7,990,663 B2 * | 8/2011 | Ziegler | .................. | H01H 83/04 361/42 |
| 8,139,328 B2 * | 3/2012 | DiSalvo | ................. | H01H 83/04 335/18 |
| 2005/0122650 A1 * | 6/2005 | Beasley, III | ......... | H02H 11/006 361/90 |
| 2005/0140476 A1 * | 6/2005 | Gao | ....................... | H01H 83/04 335/18 |
| 2012/0154972 A1 * | 6/2012 | McMahon | ............. | H01H 47/22 361/187 |

* cited by examiner

*Primary Examiner* — Zeev V Kitov
(74) *Attorney, Agent, or Firm* — Mei & Mark LLP

(57) ABSTRACT

The present disclosure provides an improved leakage protection socket with reverse connection protection function. The electromagnetic tripping mechanism comprises a trip coil, an iron core and a permanent magnet that fit with a return spring, the iron core has, in its front end, a boss to pull the lock for horizontal movement, the movable input contacts are clamped by a rib slot of an upper tripper that can moves upward and downward along with the reset button. There is also provided a reverse connection trip device, which has a slope that coordinates with the boss of the iron core, upon reverse connection, the trip coil generates a magnetic field in the same orientation with the permanent magnet.

10 Claims, 10 Drawing Sheets

LEAKAGE PROTECTION SOCKET WITH REVERSE CONNECTION PROTECTION

CROSS-REFERENCE TO RELATED APPLICATION

This application claims priority to and incorporates herein Chinese patent application numbers 201310157811.8, filed on Apr. 28, 2013.

TECHNICAL FIELD

The present disclosure relates to a leakage protection socket, in particular to an improved leakage protection socket with reverse connection protection function.

BACKGROUND

A leakage protection socket of prior art generally comprises: a housing; a pair of output conductors with conductive sleeves; a reset button; power input terminals; power output terminals; a pair of movable input contacts connected to the power input terminals; a pair of movable output contacts connected to the power output terminals; dual induction coils for detecting leakage current; and a circuit board. A lock and an electromagnetic tripping mechanism are further provided in the housing, the lock hooks and positions the reset button so that the movable input contacts are conductively connected to the output conductors, the electromagnetic tripping mechanism separates the reset button from the lock in the event of leakage current. For example, in a patent application No. 201110048951.2, the electromagnetic tripping mechanism comprises a sleeve, an iron core located in the sleeve, and a permanent magnet below the iron core, on the sleeve there is wound an electromagnetic coil that generates magnetic field so that, upon reverse connection, the iron core moves down against the elastic resisting force of the movable input contacts and the movable output contacts and is attracted to the permanent magnet. The upper end of the iron core is provided with a transfer member that, upon reverse connection, moves down along with the iron core and in the meanwhile separates the movable output contacts from the output conductors, and connects the movable input contacts with the output conductors. This leakage protection socket has the following problem: the iron core is disposed longitudinally, because of the limited depth of the socket, it is highly inconvenient to assemble internal components.

SUMMARY

The object of the present disclosure is to overcome the shortcomings of the prior art, and to provide a simple and high-precision improved leakage protection socket with reverse connection protection function with.

To achieve the above object, the present disclosure adopts the following technical solution. An improved leakage protection socket with reverse connection protection function comprises a housing; a pair of output conductors with conductive sleeves; a reset button, power input terminals; power output terminals; a pair of movable input contacts connected to the power input terminals; a pair of movable output contacts connected to the power output terminals; dual induction coils for detecting leakage current; and a circuit board. A lock and an electromagnetic tripping mechanism are further provided in the housing. The lock hooks and positions the reset button so that the movable input contacts are conductively connected to the output conductors. The electromagnetic tripping mechanism separates the reset button from the lock in the event of leakage current. The electromagnetic tripping mechanism comprises a trip coil, an iron core and a permanent magnet that fit with a return spring. The iron core has, in its front end, a boss to pull the lock for horizontal movement. The movable input contacts are clamped by a rib slot of an upper tripper that can moves upward and downward along with the reset button. There is also provided a reverse connection trip device, which has a slope that coordinates with the boss of the iron core. The movable output contacts link with the reverse connection trip device and is conductively connected to the output conductors in a natural state. Upon reverse connection, the trip coil generates a magnetic field in the same orientation with the permanent magnet, so that the iron core is attracted to the permanent magnet and the reverse connection device is driven to move down to conductively connect the movable input contacts with the output conductors and press the movable output contacts to separate from the output conductors.

Compared with the prior art, the present disclosure has the following advantages: upon reverse connection, the movable output contacts are quickly separated from the output conductors through the reverse connection trip device, which make the socket safe for use; the seesaw switch provides connection for the analog resistor and the trip coil, and the two are interlocked, which has simple structure and is reliable; a circuit switch is formed by the movable metal piece that follows the lower tripper and a static metal sheet that has upper and lower lateral contact angles, the switch is closed when the lower tripper moves upward to a limit position and moves downward to a limit position, and is disconnected when in an intermediate state, the design is reasonable, the circuit switch is supplied with electricity when necessary, which saves energy.

DETAILED DESCRIPTION

Figure 1:
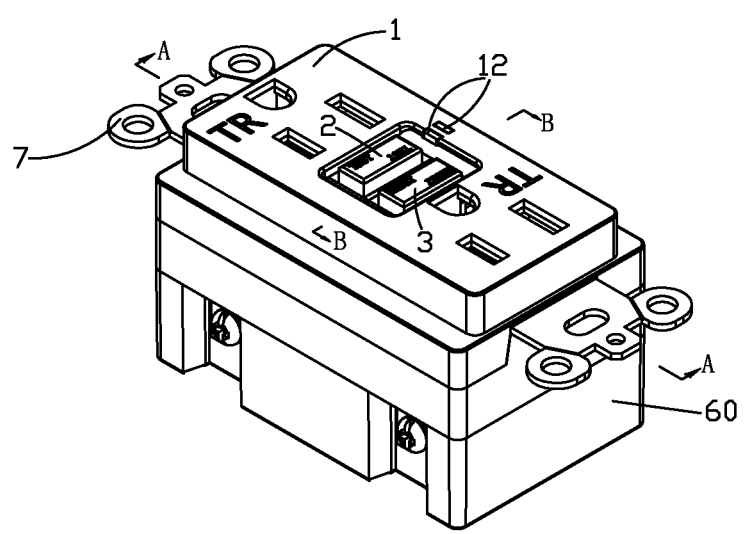
FIG. 1 is a schematic view of the assembly structure of present disclosure.
Figure 2:
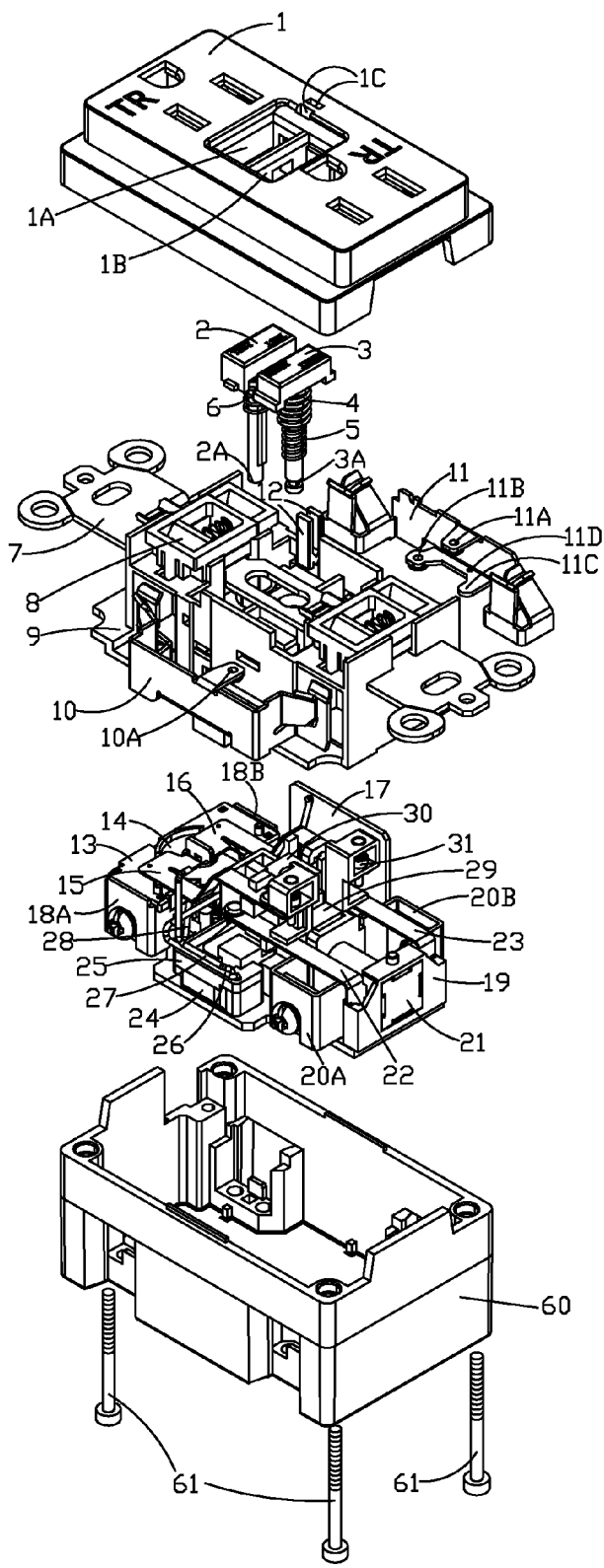
FIG. 2 is an exploded schematic of present disclosure.
Figure 3:
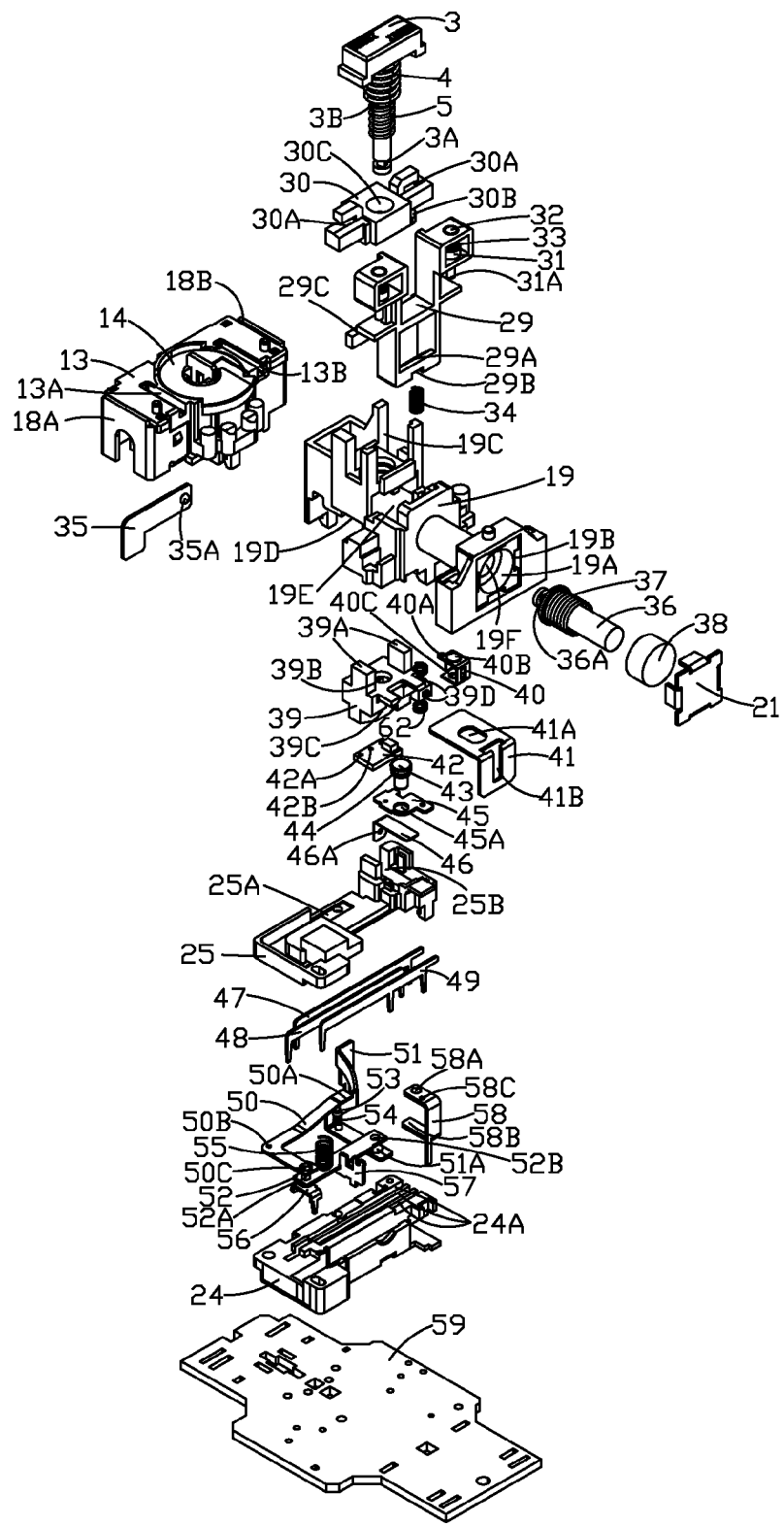
FIG. 3 is the schematic structure view of components of the present disclosure, such as the reverse connection trip device and the lock mechanism.
Figure 4:
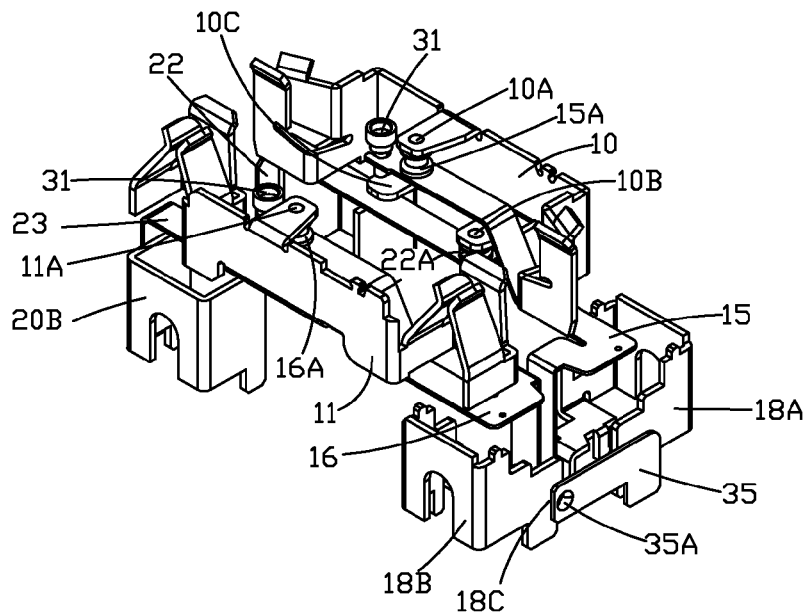
FIG. 4 is the schematic structure view of the assembling relationship of output conductors, movable input contacts and movable output contacts of the present disclosure.
Figure 5:
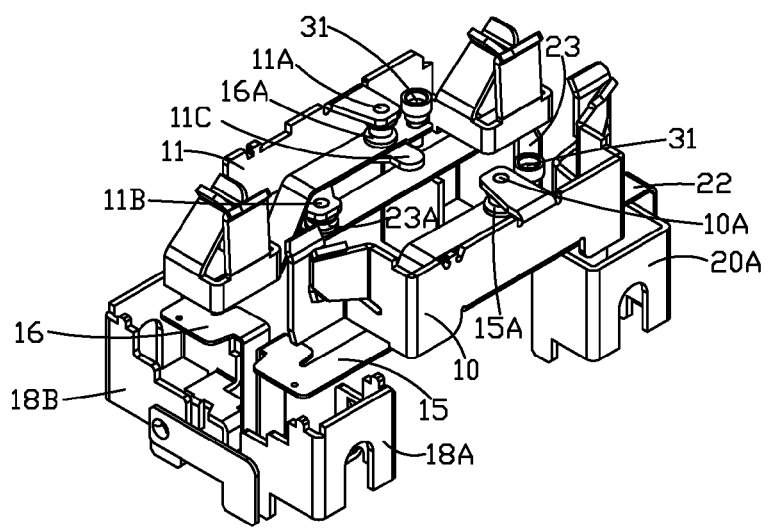
FIG. 5 is the schematic structure view of FIG. 4 in another orientation.
Figure 7:
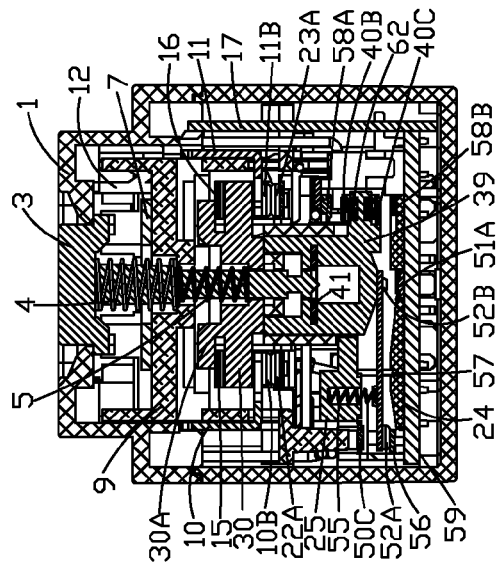
FIG. 7 is a B-B sectional view of the present disclosure of FIG. 1 at an initial state.
Figure 6:
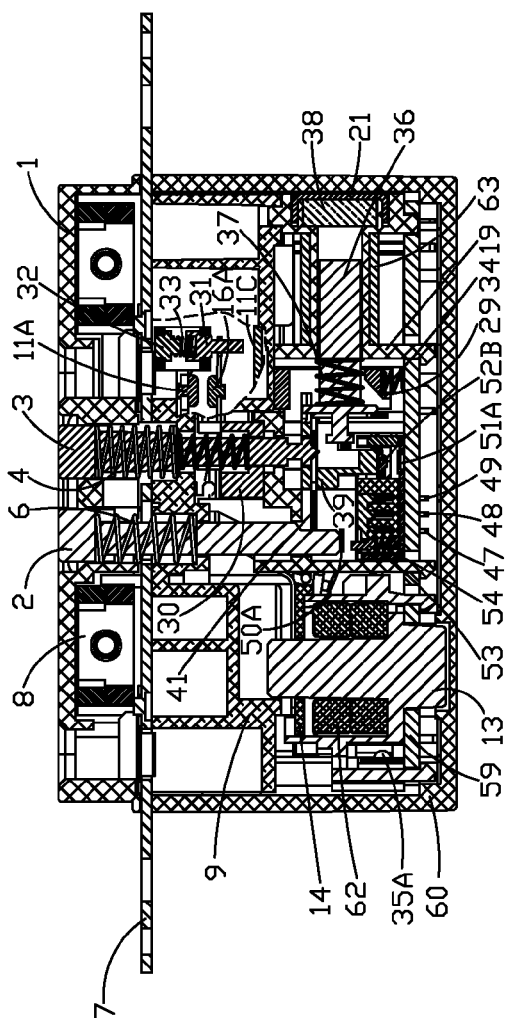
FIG. 6 is an A-A sectional view of the present disclosure of FIG. 1 at an initial state.
Figure 9:
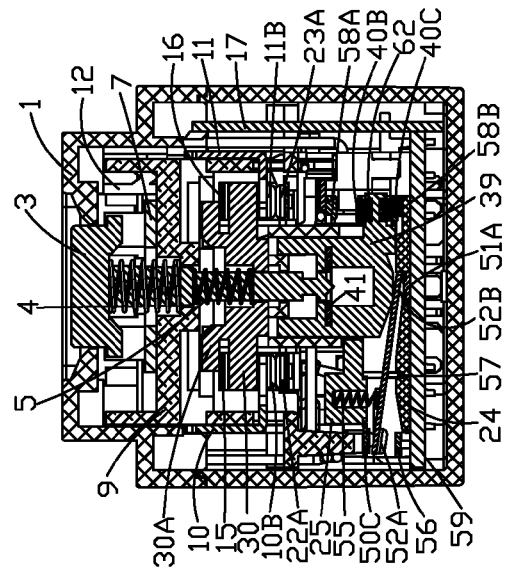
FIG. 9 is a B-B sectional view of the present disclosure of FIG. 1 at the moment of the reset button being pressed.
Figure 8:
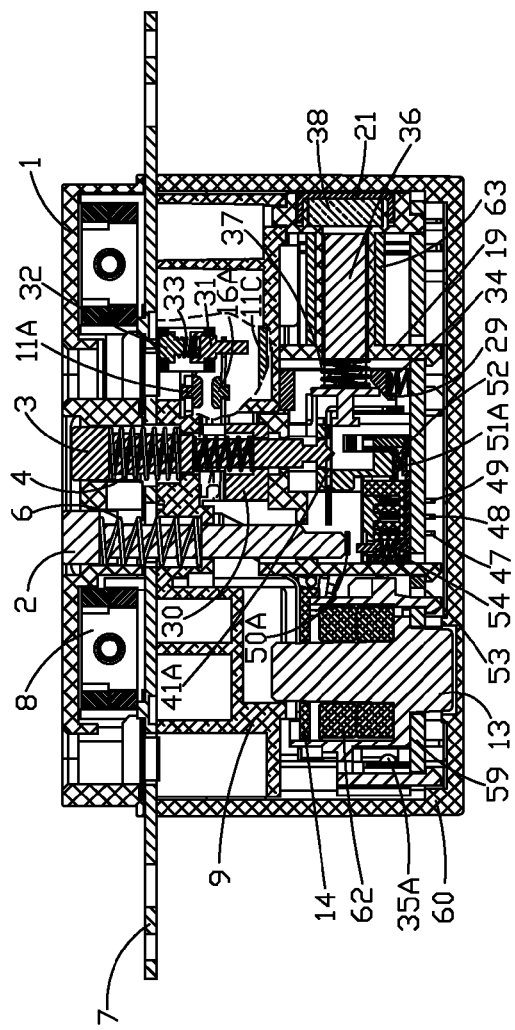
FIG. 8 is an A-A sectional view of the present disclosure of FIG. 1 at the moment of the reset button being pressed.
Figure 11:
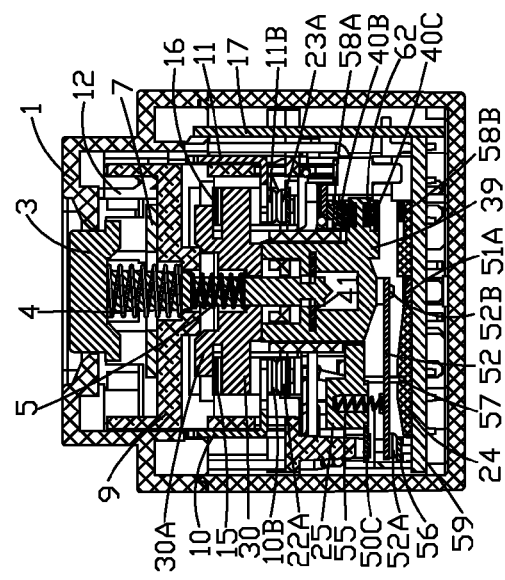
FIG. 11 is a B-B sectional view of the present disclosure of FIG. 1 at the state after successful resetting.
Figure 10:
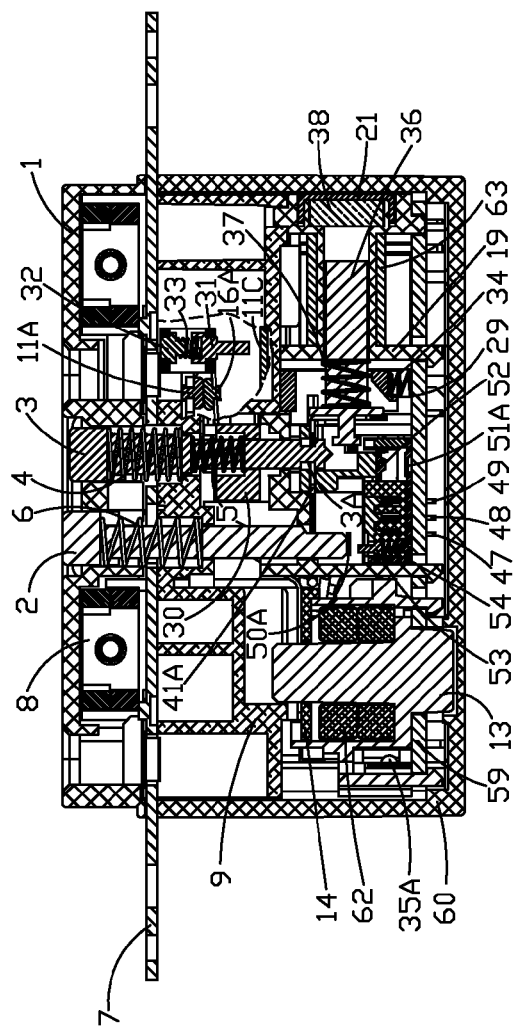
FIG. 10 is an A-A sectional view of the present disclosure of FIG. 1 at the state after successful resetting.
Figure 12:
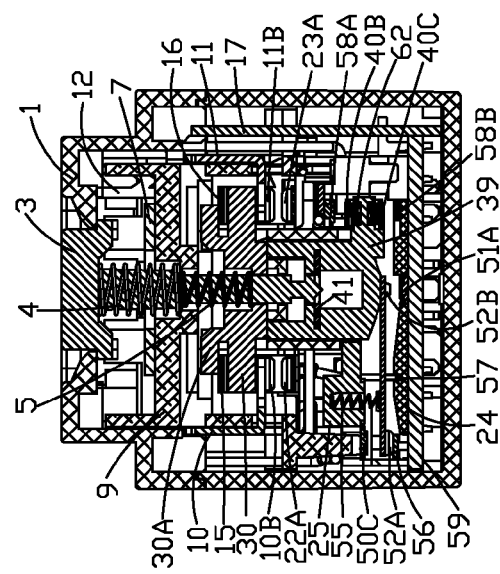
FIG. 12 is an A-A sectional view of the present disclosure of FIG. 1 at the state of reverse connection.
Figure 13:
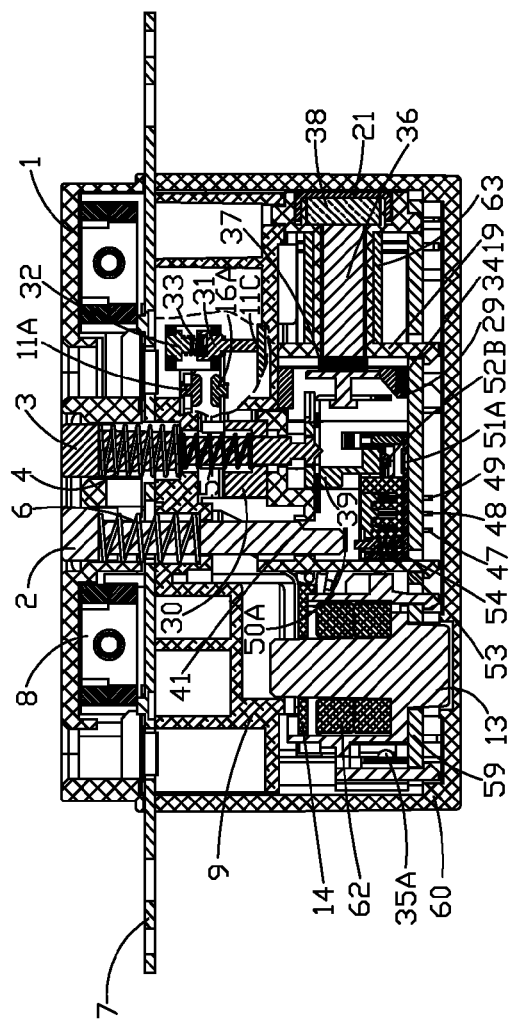
FIG. 13 is a B-B sectional view of the present disclosure of FIG. 1 at the state of reverse connection.

The present disclosure is further described in detail with references to drawings and embodiments. Referring to FIG. 1 to FIG. 16, an improved leakage protection socket with reverse connection protection function according to the present disclosure comprises: a housing (including a cover 1 and a base 60), a pair of output conductors (10, 11) with conductive sleeves, a reset button 3, power input terminals (18A, 18B), power output terminals (20A, 20B), a pair of movable input contacts (15, 16) connected to the power input terminals, a pair of movable output contact (22, 23) connected to the power output terminals, dual induction coils (L1, L2) for detecting leakage current, and a circuit board 59. Inside the housing, there are also provided a lock 41, which hooks and positions the reset button so that the movable input contacts are conductively connected to the output conductors, and an electromagnetic tripping mechanism, which separates the reset button from the lock in the event of leakage current. The electromagnetic tripping mechanism comprises a trip coil SOL, an iron core 36 and a permanent magnet 38 that fit with a return spring. The iron core has, in its front end, a boss 36A to pull the lock for horizontal movement. The movable input contacts are clamped by a rib slot 30A of an upper tripper 30 that can move upward and downward along with the reset button, the movable input contacts move upward and downward along with the upper tripper. There is also provided a reverse connection trip device 29, which has a slope 29A that coordinates with the boss 36A of the iron core, the movable output contacts link with the reverse connection trip device and are conductively connected to the output conductors (10, 11) in a natural state. Upon reverse connection, the trip coil generates a magnetic field in the same orientation with the permanent magnet 38, so that the iron core is attracted to the permanent magnet 38 and the reverse connection device 29 is driven to move down to conductively connect the movable input contacts (15, 16) with the output conductors (10,11) and press the movable output contacts (22, 23) to separate from the output conductors (10, 11). The movable output contacts stop or move following the reverse connection trip device. This means that it is assured that in any state there are only two pairs of conductors that are not in contact with each other (conductors in contact with each other is deemed as the same conductor).

The socket further comprises a lower tripper 39 that can lift the upper tripper 30. The lock 41 comprises a horizontal plate and a bent plate, the horizontal plate has a through hole 41A that accommodates a reset button guide post, the bent plate is provided with a through slot 41B to place an iron core projection. The reverse connection device 29 comprises an insulating frame, whose bottom has an elastic return element (spring in this embodiment) 34, the lower part of the insulating frame has a through hole for the iron core front boss 36A to pass through, the lower edge of the through hole has a slope 29A that coordinates with the iron core boss, the corresponding outside of the middle part of the insulating frame has a beam 29C for pressing or lifting the movable output contacts, the upper part has a pair of rectangular frames, inside which there are provided a protruding nail 31A projecting beyond the lower end of the rectangular frame, a spring 33 that fits on the upper end of the protruding nail, and a positioning piece 32 whose upper end extends into the spring to position the protruding nail with respect to the top of the rectangular frame. Such an arrangement with separate parts gives convenient assembling. The front ends of the movable input contacts each have a split end or a circular hole. The protruding nail 31 is located in the split end or circular hole of the movable input contact, the output conductors have static contact ends (10C, 11C) extending from the inner sides of the output conductors, the static contact ends can come into contact with the lower end of the protruding nail.

The socket also comprises a seesaw switch K1, which provides the trip coil SOL with a closed circuit that passes through the dual induction coils (L1, L2) in the normal state and provides analog leak circuit for the analog resistor R4 at the moment the reset button is pressed down. The seesaw switch K1 comprises a support plate 57 and a movable contact lever 52 whose two ends sway upward and downward with the support plate as the pivot point. Inside the housing there are provided altogether 4 static contact points that coordinate with the movable contact lever 52 (including the support plate). The right end of the movable contact lever is pressed by the lower tripper 39 and is suspended in the air, the left end comes into contact with the lower left static contact point 56 under the force of the spring element 55. Through the static contact points as the support plate and the circuit switch where the static contact point 56 is formed into the trip coil to provide closed circuit, when the lower tripper 39 forces the right end of the movable contact lever 52 to contact with the static contact point 51A on the lower right following the instant pressure of lowering of the reset button 3, the left end comes into contact with the upper left static contact point 50C, so that the analog resistor R4 forms analog leaking current produced through the dual induction coils. The static contact ends of the seesaw switch are connected to the input end of the trip coil either in the working state or in the non-working state. The rear end of the seesaw switch is connected to the power jacket either in the working state or in the non-working state. The movable contact lever of the seesaw switch is provided above the pivot point of the support plate, an assistant contact spring is provided above the movable contact lever. When the leakage protection socket is either in the non-working state or in the working state, the assistant contact spring is in a relaxed state.

On the circuit board 59 there is inserted a static metal sheet 58 with an upper lateral foot and a lower lateral foot. A movable contact piece is provided on a side wall of the lower tripper 39. The movable metal piece and the static metal sheet 58 constitute the switch K2 that is closed in the upper limit position and lower limit positions of the lower tripper. One end of the switch K2 is connected to the neutral line or live line of the power through the dual induction coils, the other end is connected to a control chip IC1 and the cathode of a SCR V4 via a diode V1-3, and is connected to a working indicator.

The sidewall of the lower tripper sidewall 39 has a convex shoulder 39D, whose upper and lower surfaces respectively have a blind hole. The movable metal piece is a metal frame 40 that fits on the convex shoulder, the upper and lower surfaces of the metal frame 40 are both provided with electrical contact points (40B, 40C), two vertical surfaces of the remaining four side surfaces are enclosed and two vertical surfaces are open. The metal frame 40 is flexibly positioned with respect to the lower tripper 39 by means of a pair of small spring 62, the small spring 62 is provided in the upper and lower blind holes on the lower tripper protruding shoulder, and its two ends abut the top and bottom of the inner wall of the metal frame.

A protruding shoulder 30B extends out of the sidewall below the beam of the upper tripper 30. A metal transfer member 43 with an elastic return mechanism is provided below the protruding shoulder of the upper tripper. The metal transfer member 43 is fitted in the through hole of the upper metal sheet 45. A lower metal sheet 46 is provided below the upper metal sheet 45. The upper metal sheet 45, the lower metal sheet 46, and the metal transfer member 43 constitute the reverse connection protection switch K3, which is usually closed, and is conductively connected via the metal transfer member when the upper tripper is in the normal state, and is disconnected when the upper tripper moves upward after successful resetting.

There is also provided a trip coil frame 19 inside the housing. One side of the trip coil frame 19 has a tubular cavity for the iron core to move laterally. The outer wall of the tubular cavity surrounds the trip coil SOL. The other side of the trip coil frame has a limit groove for the beam of the upper tripper to move longitudinally and a limit plane for limiting downward movement of the upper tripper. The lower tripper 39 is located below the limiting plane of the trip coil frame. From the lower tripper there extends a pair of cantilevers for boosting the lateral beam 39C of the reverse connection trip device 29 under the lifting force of the reset button. An L-shaped lock 41 is provided below the cantilevers of the lower tripper. A pair of protruding nails 39A are provided on the upper surface of the lower tripper for boosting the upper tripper under the lifting force of the movable contact lever of the seesaw switch. A void area is provided on the limit plane of the trip coil frame 19 for the pair of protruding nails to project out.

There is also provided a regular self-examination circuit board 17 in the housing. The leakage current detection circuit on the circuit board is driven regularly by the regular self-examination circuit board to generate analog leakage current.

In order to prevent damage from lightning and other transient high voltage to the socket, a discharge metal sheet 35 is provided outside the power input terminals (18A, 18B). One end of the discharge metal sheet 35 is plugged on the circuit board 59 and is connected to one of the power input terminals; the other end is provided with a protrusion 35A, which is spanned from one of the power input terminals to form a discharge gap therebetween.

In order to improve the strength of the magnetic field of the permanent magnet, the electromagnetic tripping mechanism further comprises a metal shield sheet 21 fixed inside the housing. The metal shield sheet has four claws or tightening lips. In this embodiment, the permanent magnet is positioned by means of the claws and the magnetic field lines are concentrated through the claws.

Figure 14:
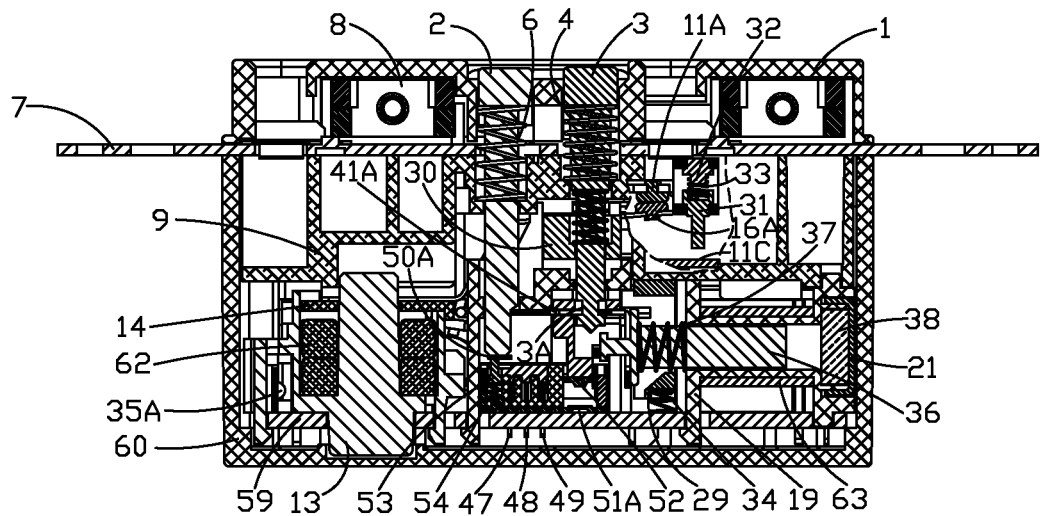
FIG. 14 is an A-A sectional view upon the test button is pressed when the service life is ended.
Figure 15:
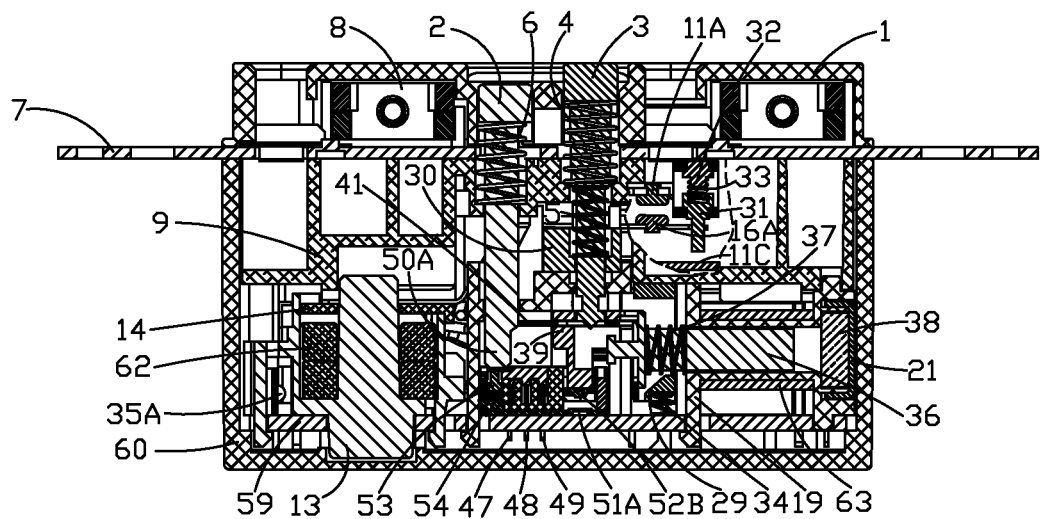
FIG. 15 is a B-B sectional view of the tripper when the test button is pressed to a second position.
Figure 16:
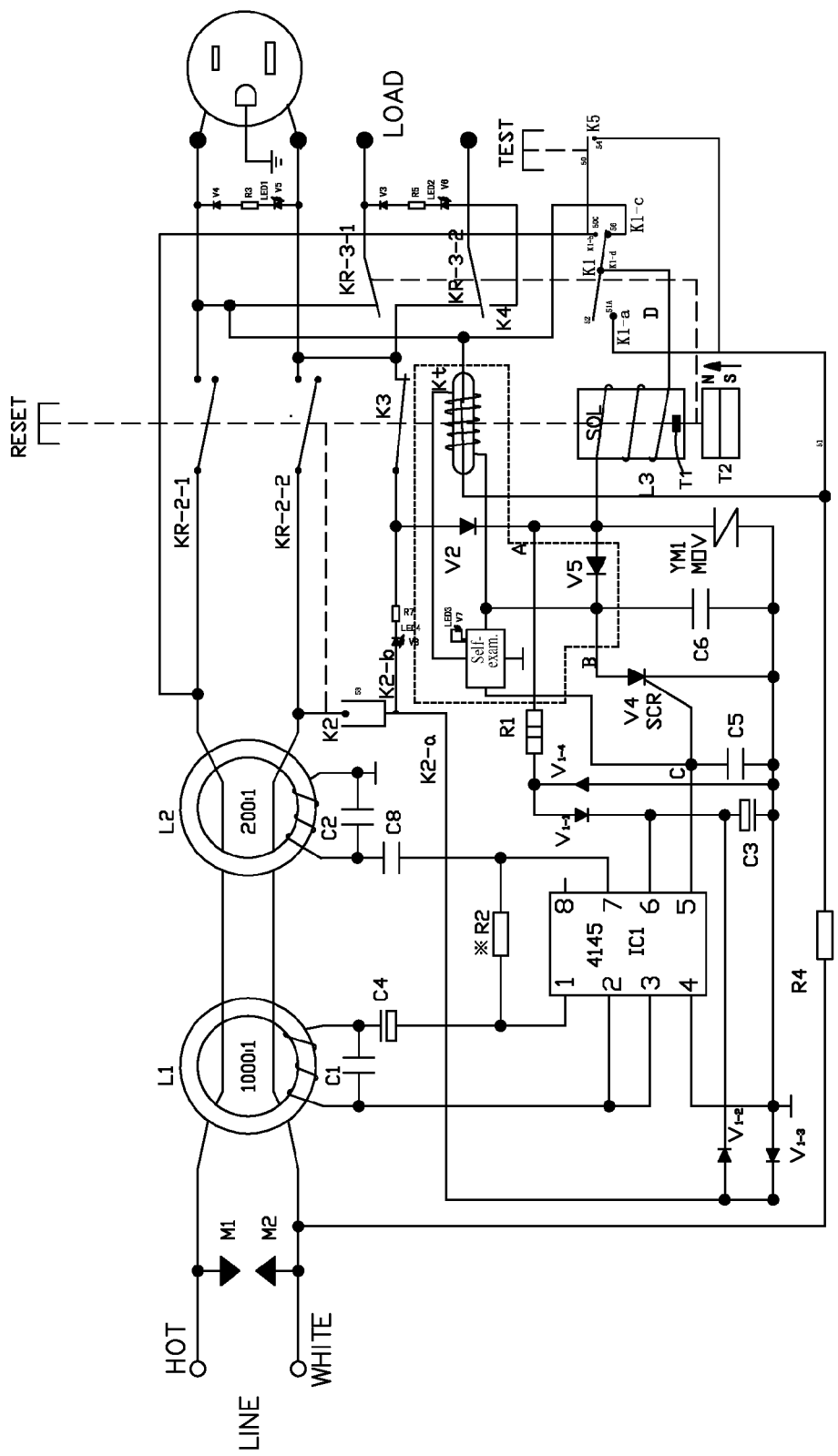
FIG. 16 is a circuit diagram of the disclosure.

The leakage protection socket according to the present disclosure also has end-of life detection function, comprising a test button TEST, a test switch K5 (including a movable metal piece 50 and a static metal sheet 54). With a successful resetting, when the test button is pressed, K5 is closed, the analog resistor R3 is connected through and generates analog leakage circuit. If tripping occurs, it shows the life does not come to an end yet; if no tripping is possible, it means the life has come to an end. Referring to FIG. 14, the test button TEST is pressed into a second position, the lock 42 is driving to move right through the slop at the lower end of the guide post of the test button, the lock 42 detaches from the reset button and is tripped mechanically, as shown in FIG. 15. Hereinafter, no resetting occurs even the reset button is pressed. The user will be alarmed to change the socket with by the indicator.

While the disclosure has been described and illustrated with reference to the preferred embodiments, one of ordinary skill in the art should understand that the disclosure is not limited to the embodiments described above, the form and detail can be changed variously within the scope of the claims.

I claim:

1. An improved leakage protection socket with reverse connection protection function, comprising:
    a housing;
    a pair of output conductors with conductive sleeves;
    a reset button, power input terminals;
    power output terminals;
    a pair of movable input contacts connected to the power input terminals;
    a pair of movable output contacts connected to the power output terminals;
    dual induction coils for detecting leakage current; and
    a circuit board;
    wherein a lock and an electromagnetic tripping mechanism are provided in the housing; the lock hooks and positions the reset button so that the movable input contacts are conductively connected to the output conductors; and the electromagnetic tripping mechanism separates the reset button from the lock in the event of leakage current;
    wherein the electromagnetic tripping mechanism comprises a trip coil, an iron core and a permanent magnet that fit with a return spring; the iron core has, in its front end, a boss to pull the lock for horizontal movement; and the movable input contacts are clamped by a rib slot of an upper tripper that can moves upward and downward along with the reset button;
    wherein a reverse connection trip device is provided in the housing, the reverse connection trip device having a slope that coordinates with the boss of the iron core; and the movable output contacts link with the reverse connection trip device and is conductively connected to the output conductors in a natural state; and
    wherein upon reverse connection, the trip coil generates a magnetic field in the same orientation with the permanent magnet, so that the iron core is attracted to the permanent magnet and the reverse connection device is driven to move down to conductively connect the movable input contacts with the output conductors and press the movable output contacts to separate from the output conductors.

2. The improved leakage protection socket with reverse connection protection function according to claim 1, wherein:
    the socket further comprises a lower tripper that can lift the upper tripper;
    the lock comprises a horizontal plate and a bent plate, wherein the horizontal plate has a through hole that accommodates a reset button guide post, and the bent plate is provided with a through slot to place an iron core projection; and
    the reverse connection device comprises an insulating frame, whose bottom has an elastic return element, wherein:
        the lower part of the insulating frame has a through hole for the iron core front boss to pass through;
        the lower edge of the through hole has a slope that coordinates with the iron core boss;

the corresponding outside of the middle part of the insulating frame has a beam for pressing or lifting the movable output contacts;

the upper part of the insulating frame has a pair of rectangular frames, inside of which there are provided a protruding nail projecting beyond the lower end of the rectangular frame, a spring that fits on the upper end of the protruding nail, and a positioning piece whose upper end extends into the spring to position the protruding nail with respect to the top of the rectangular frame;

the front end of the movable input contact has a split end or a circular hole;

the protruding nail is located in the split end or circular hole of the movable input contact; and the output conductors have static contact ends extending from the inner sides of the output conductors, and the static contact ends can come into contact with the lower end of the protruding nail.

3. The improved leakage protection socket with reverse connection protection function according to claim 2, wherein:

the socket further comprises a seesaw switch, which provides the trip coil SOL with a closed circuit that passes through the dual induction coils in the normal state and provides analog leak circuit for the analog resistor at the moment the reset button is pressed down;

the seesaw switch comprises a support plate and a movable contact lever whose two ends sway upward and downward with the support plate as the pivot point;

inside the housing there are provided altogether four static contact points that coordinate with the movable contact lever;

the right end of the movable contact lever is pressed by the lower tripper and is suspended in the air; the left end comes into contact with the lower left static contact point under the force of the spring element, through the static contact point as the support plate and the circuit switch where the static contact point is formed into the trip coil to provide closed circuit; and when the lower tripper forces the right end of the movable contact lever to contact with the static contact point on the lower right following the instant pressure of lowering of the reset button, the left end comes into contact with the upper left static contact point, so that the analog resistor forms analog leaking current produced through the dual induction coils.

4. The improved leakage protection socket with reverse connection protection function according to claim 2, wherein:

on the circuit board there is inserted a static metal sheet with an upper lateral foot and a lower lateral foot;

a movable contact piece is provided on a side wall of the lower tripper; and the movable metal piece and the static metal sheet constitute a switch that is closed in the upper limit position and lower limit positions of the lower tripper.

5. The improved leakage protection socket with reverse connection protection function according to claim 4, wherein:

the sidewall of the lower tripper sidewall has a convex shoulder whose upper and lower surfaces respectively have a blind hole;

the movable metal piece is a metal frame that fits on the convex shoulder;

the upper and lower surfaces of the metal frame are both provided with electrical contact points;

two vertical surfaces of the remaining four side surfaces are enclosed and two vertical surfaces are open;

the metal frame is flexibly positioned with respect to the lower tripper by means of a pair of small spring; and the small spring is provided in the upper and lower blind holes on the lower tripper protruding shoulder and its two ends abut the top and bottom of the inner wall of the metal frame.

6. The improved leakage protection socket with reverse connection protection function according to claim 2, wherein:

a protruding shoulder extends out of the sidewall below the beam of the upper tripper;

a metal transfer member with an elastic return mechanism is provided below the protruding shoulder of the upper tripper;

the metal transfer member is fitted in the through hole of the upper metal sheet;

a lower metal sheet is provided below the upper metal sheet; and the upper metal sheet, the lower metal sheet, and the metal transfer member constitute a reverse connection protection switch, which is usually closed, and is conductively connected via the metal transfer member when the upper tripper is in the normal state, and is disconnected when the upper tripper moves upward after successful resetting.

7. The improved leakage protection socket with reverse connection protection function according to claim 3, wherein:

there is also provided a trip coil frame inside the housing;

one side of the trip coil frame has a tubular cavity for the iron core to move laterally;

the outer wall of the tubular cavity surrounds the trip coil;

the other side of the trip coil frame has a limit groove for the beam of the upper tripper to move longitudinally and a limit plane for limiting downward movement of the upper tripper;

the lower tripper is located below the limiting plane of the trip coil frame, from the lower tripper there extending a pair of horizontal cantilevers for boosting the lateral beam of the reverse connection trip device under the lifting force of the reset button;

a L-shaped lock is provided below the cantilevers of the lower tripper;

a pair of protruding nails are provided on the upper surface of the lower tripper for boosting the upper tripper under the lifting force of the movable contact lever of the seesaw switch; and a void area is provided on the limit plane of the trip coil frame for the pair of protruding nails to project out.

8. The improved leakage protection socket with reverse connection protection function according to claim 1, wherein there is also provided a regular self-examination circuit board in the housing and the leakage current detection circuit on the circuit board is driven regularly by the regular self-examination circuit board to generate analog leakage current.

9. The improved leakage protection socket with reverse connection protection function according to claim 1, wherein: a discharge metal sheet is provided outside the power input terminals, one end of the discharge metal sheet being plugged on the circuit board and is connected to one of the power input terminals, and the other end being provided with a protrusion, which is spanned from one of the power input terminals to form a discharge gap therebetween.

10. The improved leakage protection socket with reverse connection protection function according to claim 1, wherein the electromagnetic tripping mechanism further comprises a metal shield sheet fixed inside the housing, the metal shield sheet having four claws or tightening lips, and wherein the permanent magnet is positioned by means of the claws or tightening lips and the magnetic field lines are concentrated through the claws or tightening lips.

* * * * *